United States Patent
Fabrizio et al.

(10) Patent No.: US 6,321,293 B1
(45) Date of Patent: Nov. 20, 2001

(54) METHOD FOR CACHING VIRTUAL MEMORY PAGING AND DISK INPUT/OUTPUT REQUESTS

(75) Inventors: Daniel Fabrizio, Wantagh; Michael L. Spilo, New York, both of NY (US)

(73) Assignee: Networks Associates, Inc., Long Island, NY (US)

( * ) Notice: Subject to any disclaimer, the term of this patent is extended or adjusted under 35 U.S.C. 154(b) by 0 days.

(21) Appl. No.: 09/105,236

(22) Filed: Jun. 26, 1998

Related U.S. Application Data

(63) Continuation-in-part of application No. 08/557,491, filed on Nov. 14, 1995, now Pat. No. 5,875,474.

(51) Int. Cl.[7] .................................................. G06F 12/08
(52) U.S. Cl. .............................................................. 711/113
(58) Field of Search ........................ 711/111, 113, 117, 711/118, 122; 710/65, 66, 68

(56) References Cited

U.S. PATENT DOCUMENTS

| | | | |
|---|---|---|---|
| 4,660,130 | * 4/1987 | Bartley et al. | 711/209 |
| 4,971,407 | * 11/1990 | Hoffman | 341/87 |
| 4,985,848 | 1/1991 | Pfeiffer et al. | 364/518 |
| 5,361,387 | * 11/1994 | Millar et al. | 395/511 |
| 5,384,912 | 1/1995 | Ogrinc et al. | 395/164 |
| 5,454,076 | * 9/1995 | Cain et al. | 345/507 |
| 5,543,822 | 8/1996 | Spilo et al. | 345/189 |
| 5,559,978 | 9/1996 | Spilo | 395/413 |
| 5,586,264 | * 12/1996 | Belknap et al. | 395/200.08 |
| 5,742,298 | * 4/1998 | Bril et al. | 345/501 |
| 5,884,093 | * 3/1999 | Berenguel et al. | 710/1 |

OTHER PUBLICATIONS

Microsoft Press Computer Dictionary, Third Edition, 1997, p. 107.*

* cited by examiner

Primary Examiner—Matthew Kim
Assistant Examiner—Christian P. Chace
(74) Attorney, Agent, or Firm—Darby & Darby

(57) ABSTRACT

A method for caching virtual memory paging requests and disk input/output requests utilizes a portion of the video memory as a location for paged memory as well as an alternative location for a disk cache system; the disk cache system is also capable of placing compressed data in a cache buffer. The portion of the video memory employed is off screen memory (OSM), access to which is controlled to make OSM available for paging or caching requirements. System operators may be monitored on a continuing basis to provide for a dynamic allocation of QSM.

3 Claims, 9 Drawing Sheets

METHOD FOR CACHING VIRTUAL MEMORY PAGING AND DISK INPUT/OUTPUT REQUESTS

This invention is a continuation-in-part of application Ser. No. 08/557,491, filed on Nov. 14, 1995 Now U.S. Pat No. 5,875,474.

FIELD OF THE INVENTION

The field of the present invention is personal computer systems, and more particularly to personal computer systems with a separate video subsystem with its own video memory. The present invention relates to a method and system for improving the efficiency of demand paged virtual memory and disk cache systems in a personal computer, thereby increasing overall system performance in a low-memory situation.

BACKGROUND OF THE INVENTION

It is axiomatic that memory requirements of software expand to fill all available Random Access Memory (RAM) and then some. Each new generation of personal computer operating system and user software is almost invariably larger than the previous generation. Unfortunately, system capacity and pricing have not kept up with such growth of a memory requirement for software and thus a greater demand is placed on the virtual memory component of the system with which the software is used.

As depicted in FIG. 1, the prior art, such as Bartley et al, U.S. Pat. No. 4,660,130, can provide a system for copying portions of RAM memory 100 out to disk 101 in the process known as "paging out", and then bringing the paged out portions back into memory while removing others when the user software requires access to the original contents of a memory range through paging mechanism 102. Several optimization routines have been proposed, including grouping the pages into active and stable groupings, and read-ahead/page-behind schemes as implemented in Microsoft's Windows operating system.

Furthermore, traditional disk caching schemes, such as that found in Microsoft's MS-DOS Smart Drive are ineffective for use in virtual memory paging because the memory used in caching is better made available to increase the pool of pageable memory. The use of memory for caching in an attempt to create more memory actually results in a net memory loss and poor performance.

In personal computer systems, the video sub-system RAM is generally separate from the main system RAM. This is due to the "dual-ported" nature of the video system; the video memory needs to be accessed by both the CPU and the video display hardware. This makes the video memory either substantially slower than regular system RAM or substantially more expensive.

In a PC system with a separate video RAM subsystem, as shown in FIG. 1, there is typically some region 107 of video memory 108 that is unused for display 109. This may be due to the "overscan" by the video signal, or may be intentionally designed as part of a video acceleration scheme for the system. The video image is typically centered in a larger rectangle including non-displayed screen area. When the video driver or controller 106 is reading the video RAM the controller accesses the memory sequentially, while the video electron beam (and thus the signal generated by the controller even when no actual beam is used) moves horizontally across the screen and then skips back to the beginning of the next line, an operation known as raster scanning. The video beam signal must also relocate from the bottom back to the top of the screen to redraw the image at the end of a full screen scan. During this period, the retrace, the video beam is actually turned off. However, the video memory is still being polled, thus any image or data in the memory that is covered by the retrace area is not displayed. This memory is considered "off screen memory" or "OSM".

RAM memory of any kind is typically packaged in units that contain bits in orders of magnitude expressed in the binary system. Common sizes currently available are 64K (K=1024), 256K, 1024K and 4096K. Because of such packaging, and because of the ability of video adapters to display in a variety of resolutions, there is frequently additional video memory left beyond the memory needed to cover the retrace periods. In addition, if a video adapter is capable of displaying resolutions higher than the one currently in use, the OSM will also encompass the difference in memory required for the two resolutions.

Prior art shows the use of OSM to accelerate video performance. Many video adapter manufacturers use OSM as a cache for video "objects", such as bitmaps, brushes, pens, patterns and the like. Bitmaps and other objects are realized directly into the OSM. The objects can then be moved directly to on-screen memory by the CPU in the video adapter without interaction with the system's main CPU or video driver 106. This approach is of limited usefulness, because objects still need to be moved back to system memory on a frequent basis, thus slowing operation, and the manipulation of video objects is of relatively small overall importance in system operation and display.

Other prior art have attempted to increase video performance by combining the video memory and system memory into a single subsystem, such as depicted in Valentaten et al, U.S. Pat. No. 5,250,940. However, as discussed, such a solution requires far more expensive hardware. The speeds at which the CPUs in current computers operate far outstrip RAM speed, thus requiring a subsystem that can support both video and CPU access to the RAM would be cost prohibitive.

The prior art has also attempted to increase video performance by buffering portions of the video memory in system RAM (Miller et al, U.S. Pat. No. 5,361,387). This approach helps improve video performance, but at the expense of available system memory, and is therefore not useful in low memory situations.

Although combining video and system memory has been shown, the methodology for putting the memory to use is either cost prohibitive, requiring costly hardware or expensive in terms of the implementation requiring additional resources. In any event, these methodologies all are intended only to enhance video performance.

A conventional disk caching arrangement, as particularly implemented in Microsoft MS-DOS as its "Smart Drive" system, is also shown in FIG. 1. In such a system disk I/O requests 104 are kept by the caching software 105 in a section of main system memory 100 known as the cache memory 105. When additional requests for the same data are made, the caching software retrieves them from this portion of memory.

SUMMARY OF THE INVENTION

It is an object of the present invention to provide overall system performance enhancement through an improved virtual memory system.

It is a further object of the present invention to provide overall system performance enhancement through an improved disk caching methodology.

These and other objectives, which will become apparent as the invention is described in greater detail, are obtained by providing a method which allows a virtual memory or disk caching system to make use of OSM. The method further allows a disk caching system that makes use of compression to optimize the use of memory allocated to the cache, regardless of whether OSM is used.

In accordance with the present invention, the OSM is set aside for use by the virtual memory and/or disk caching system as a first level cache. The OSM can be extended through the use of data compression, allowing a larger amount of data to be stored in OSM as used for paging or caching.

Although slower than the system RAM and far slower than the CPU cache, the video RAM tends to be faster than a hard drive storage, thus providing for increased system performance over hard drive-based cache and virtual memory systems.

DETAILED DESCRIPTION OF THE INVENTION

Figure 1:
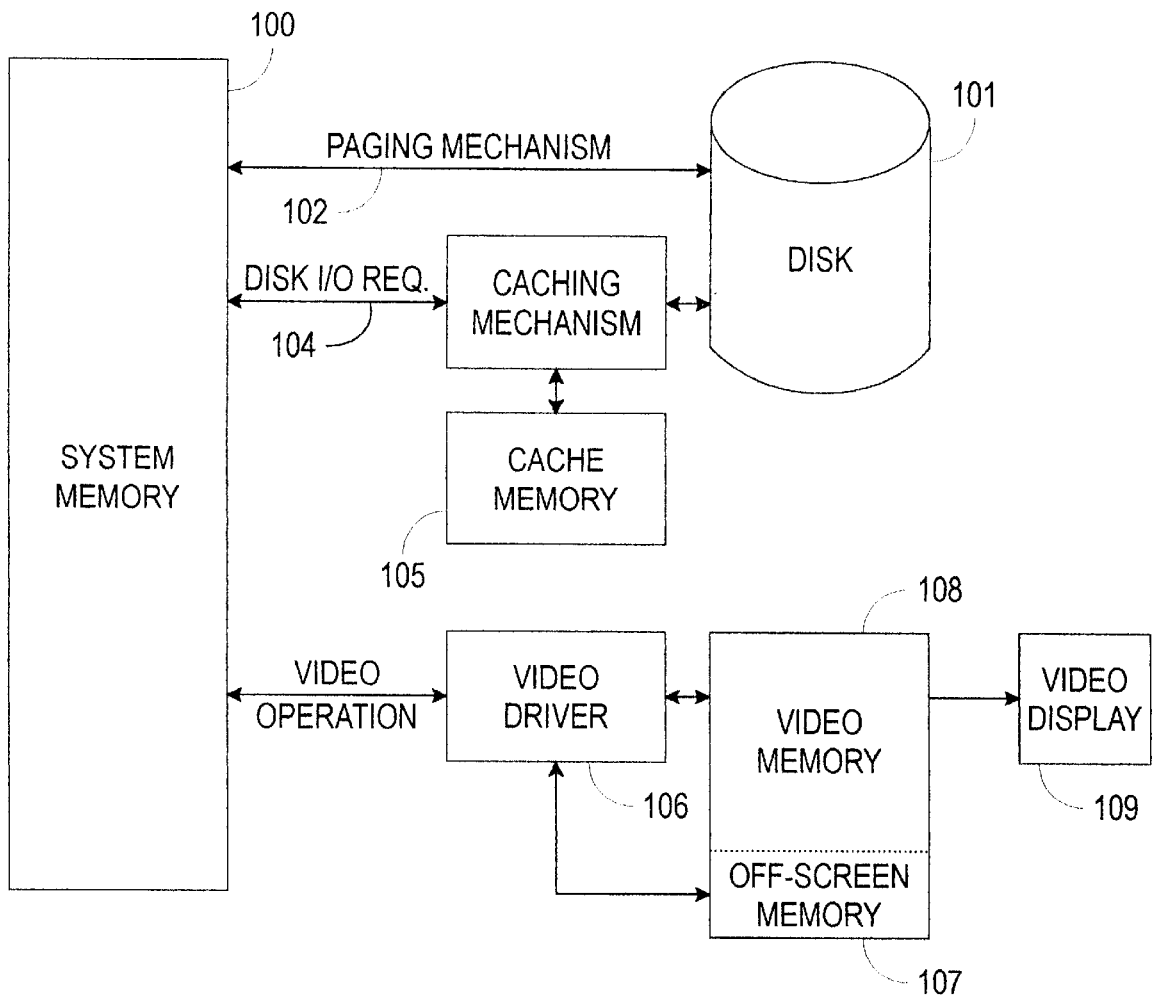
FIG. 1 is a depiction of a conventional personal computer system.

In order to accommodate OSM as a virtual memory paging resource, the throughput of the video memory must be determined to compute its best use of such memory. As used herein, "throughput" refers to a value, expressed in units of data/time for the referenced process, and is a measure of relative performance or speed. A higher throughput value represents a faster or more efficient process. In order to provide meaningful augmentation of traditional paging systems, the access time of the video memory must be faster than that of the hard drive system. In computing the effective hard drive throughput, the present invention must account for any increase in overall paging activity generated by the added overhead needed to make use of the video memory. Experimentation indicates that a reduction in overall pageable memory causes a fifty percent greater increase in paging activity. Thus, if the overhead used by the code and data structures required by the present invention is one percent of overall pageable memory, the corresponding performance improvement must be at least one and one half percent better for the inventions to be of value.

In order to effectively augment caching, the present invention must provide a read and write throughput to the video memory that is greater than the simple read throughput of the hard drive, while to augment paging only a simple comparison of read and write times need be made.

Once a determination is made of the relative performance of the disk and video memory, a decision as to whether the present invention can be meaningfully implemented in the system to augment paging, caching, or both, can be made.

Accordingly, while the present invention can be in theory implemented without consideration of the relative efficiency of the process, in practice implementation should be premised on the establishment of a speed benefit factor, and thus the effectiveness of utilizing OSM memory for some disk caching and/or demand paging operations. Such a determination can preferably be carried out by performing a conventional data compression routine for a data set and measuring the time associated with the performance thereof, including both the initial compression step and the subsequent decompression step. Similarly, hard disk throughput may be measured by obtaining throughput values for both the reading and writing of disk sectors. A value for OSM throughput may be established by obtaining time values for both read and write transfers to OSM. Combining compression throughput with OSM throughput provides a net value for OSM operation.

With the calculation of the values of the relative efficiency of OSM use can be determined. In particular, the use of OSM for caching should not be implemented unless the average combined OSM read and write time plus the compression time is less than disk throughput. Similarly, OSM paging should not be implemented unless one half of the OSM write throughput plus data compression step throughput is greater than the throughput for a disk write, and half the OSM read throughput plus decompression throughput is greater than the disk read throughput. Such testing can be performed as a stand-alone benchmark or can be implemented as part of an overall OSM cache/paging system. The methodology by which the computations are carried on is known in the art.

Figure 2:
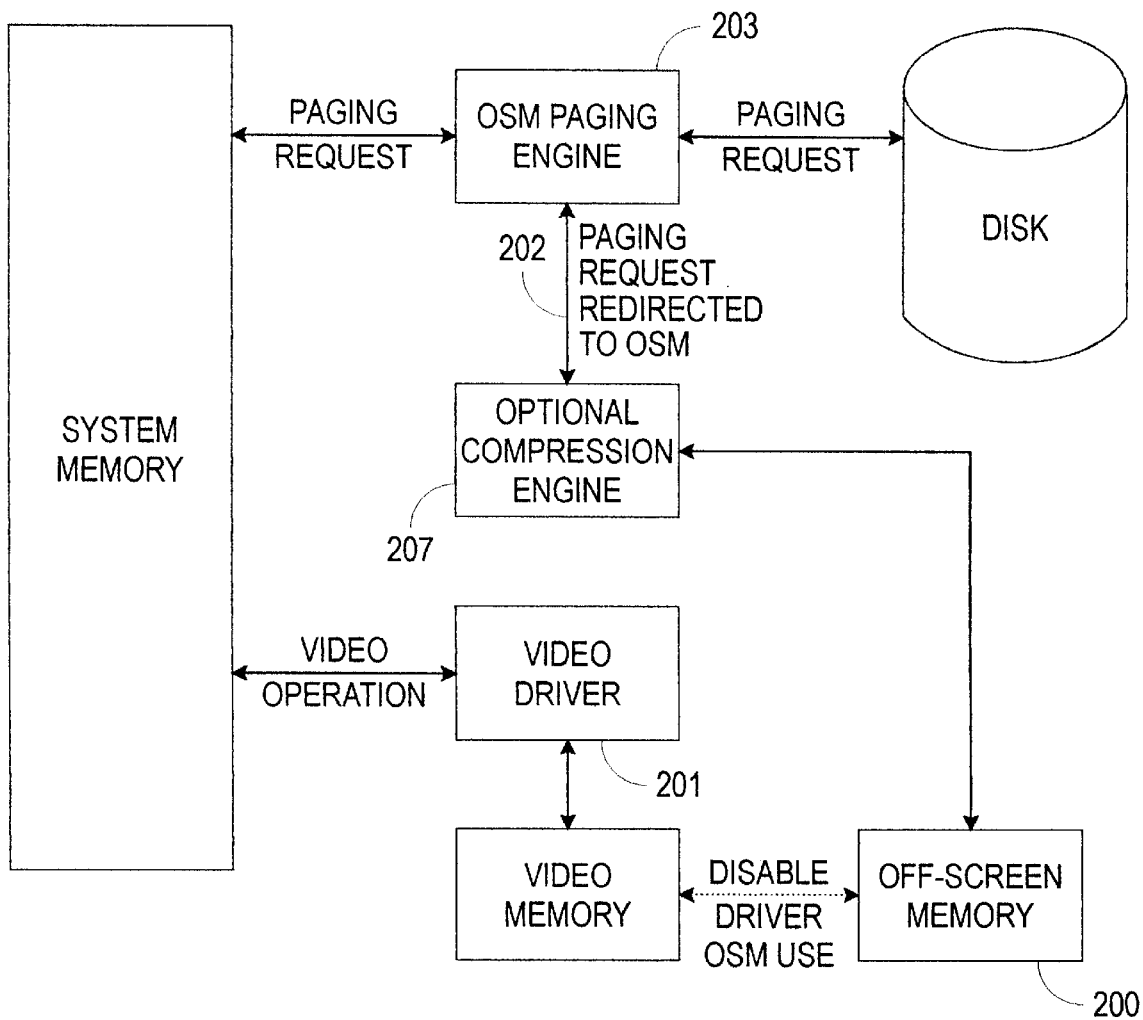
FIG. 2 is a depiction of a personal computer system embodying the capability of the present invention to utilize video memory for virtual memory paging purposes.
Figure 3:
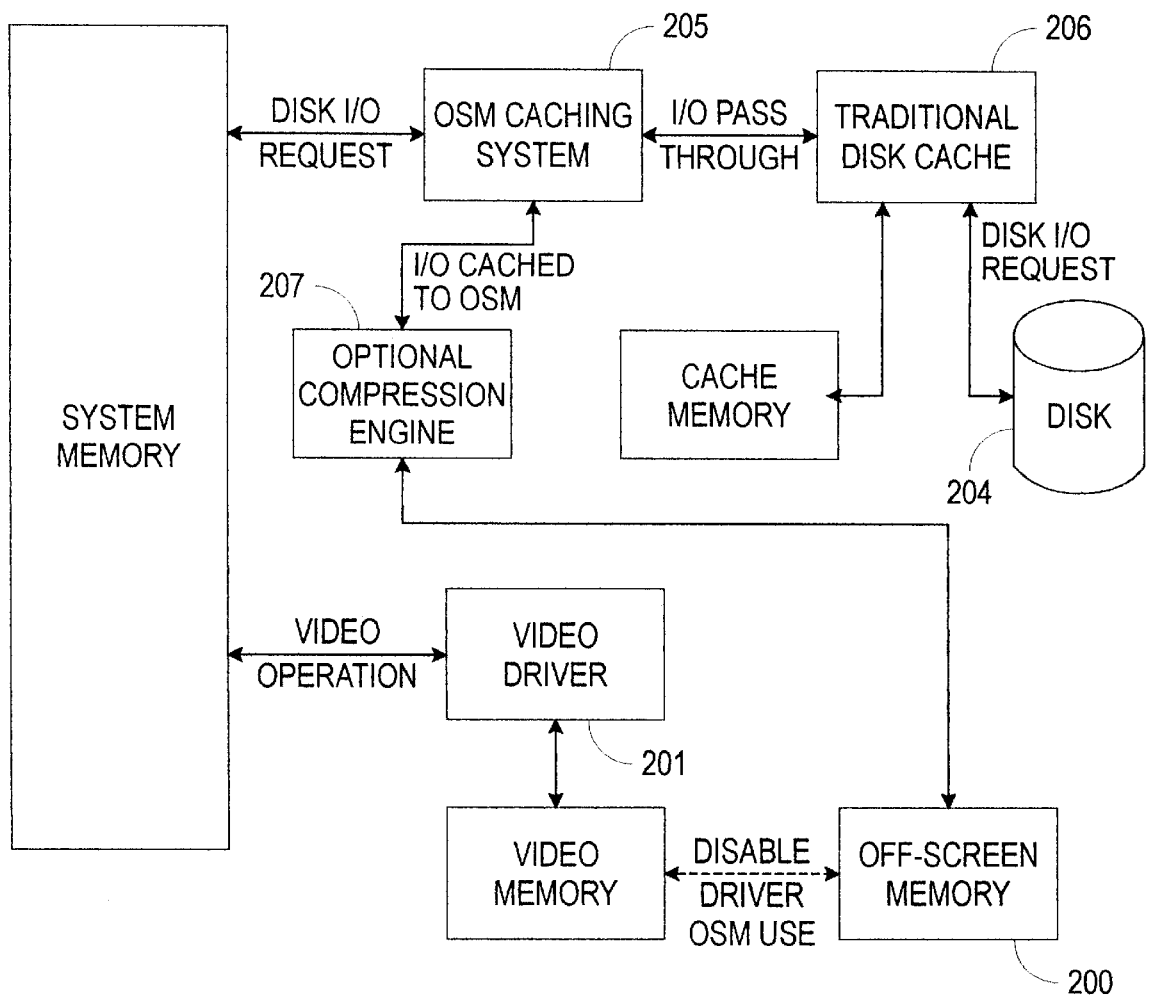
FIG. 3 is a representation of a personal computer system incorporating the caching feature of the present invention.
Figure 4:
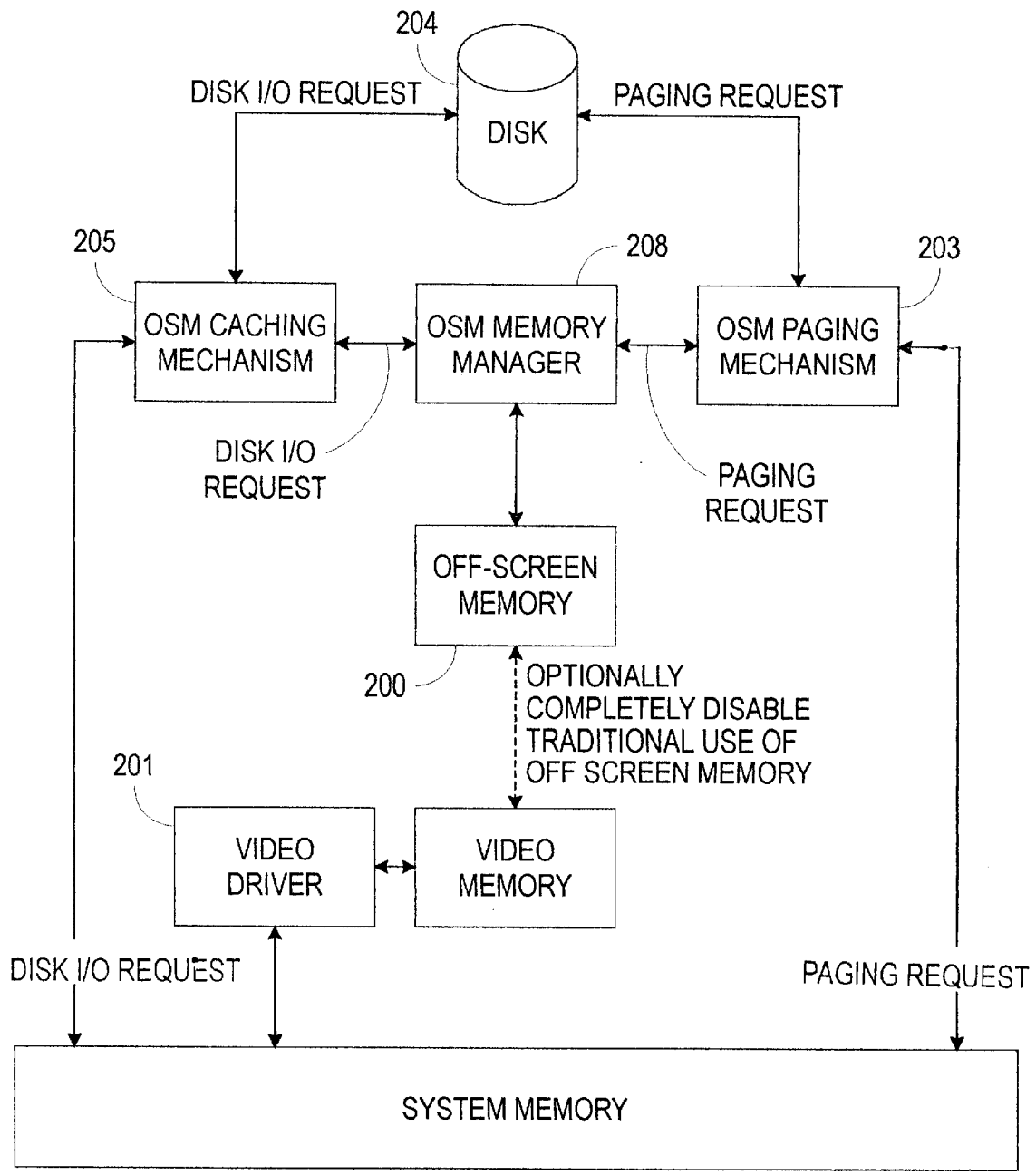
FIG. 4 is a representation of a personal computer system utilizing both paging and caching of the present invention.

Implementation of the paging and caching aspects of the present invention is depicted in FIGS. 2, 3 and 4. As shown therein, all or a portion of the off screen video memory 200 is set aside in a manner, utilizing known methodologies which ensures that this memory will not be used by video software, such as video driver 201. Any conventional video calls that would normally use this region are then intercepted, with an error condition being returned on attempts to allocate such OSM space. In some instances the video device driver 201 may make its own use of OSM, independently of the operating system, in which case the present invention attempts to allocate all OSM through usual means as known in the art, preserving the set aside area 200 in order to prevent the driver from making use of the memory on its own.

Implementation of the paging aspect alone is shown in FIG. 2. Once conventional usage of OSM is intercepted and/or rerouted, paging requests can be intercepted by the paging engine 203, which is implanted through software. If there is sufficient available OSM, page-out requests are transferred to the reserved OSM 200 through path 202. If insufficient OSM is available, the request is merely passed on to the disk 204. Page-in requests are similarly intercepted and examined by the engine 203 to determine whether the requested page is stored in OSM, and if so, the page is transferred in from the OSM 200, if not it is simply retrieved from disk.

A disk caching implementation of the invention is shown in FIG. 3. The caching engine software 205 of the invention directs I/O requests to the OSM 200 in a manner analogous to the use of a conventional disk cache 206 coupled with hard drive storage 204, as known in the art. As shown, the OSM cache can be used in conjunction with a conventional disk cache system, intercepting the disk I/O requests before they are processed by the disk cache 206. The OSM cache engine is programmed to disable the traditional cache 206 to prevent duplication of the cache function.

In order to increase the effectiveness of the OSM, data compression engine 207 may be used to compress the data being transferred to OSM either through paging or caching. In a preferred embodiment, each data item being transferred to OSM is incrementally compressed. If the compression ratio achievable for compressing the first small portion of the data item is not of a chosen minimal ratio, preferably at least in the range of 1.5 to 1, the data item is not stored in OSM, and the respective engine 203 or 205 channels the data through the alternate, conventional pathway, which may include, for the cache system, utilization of disk cache 206. Alternatively, the data may be stored in OSM, but without the compression step. The engine may appropriately keep track of such activities to effect efficient retrieval.

Fig. 4 depicts an embodiment of the invention in which both paging and disk caching are implemented together. As may be seen, both OSM paging engine 203 and OSM caching engine 205 operate in conjunction with an OSM memory manager or supervisor 208. In addition to providing compression services, the OSM memory manager also mediates requests for OSM as between paging and caching. In general, the manager gives priority to paging over cache requests.

In a preferred embodiment, the OSM manager monitors past virtual memory paging activity, as well as memory usage and availability, to determine if further paging activity is likely. If available memory is low and paging activity is high, OSM memory is allocated for exclusive use of paging, and disk caching is disabled. The OSM manager also monitors the level of graphical commands being sent to the video driver 201 and the level of disk I/O command being processed. These levels are used to alternatively reserve OSM exclusively for disk caching if disk activity is high and graphics activity is low.

Such analysis can be performed on a continuous basis; whereby the usage of OSM is varied, depending on the changing requirements of the system. When disk and paging activity are low, and graphical activity is high, the OSM manager can further disable both caching and paging, to allow the OSM to be utilized for conventional video memory caching.

Figure 5:
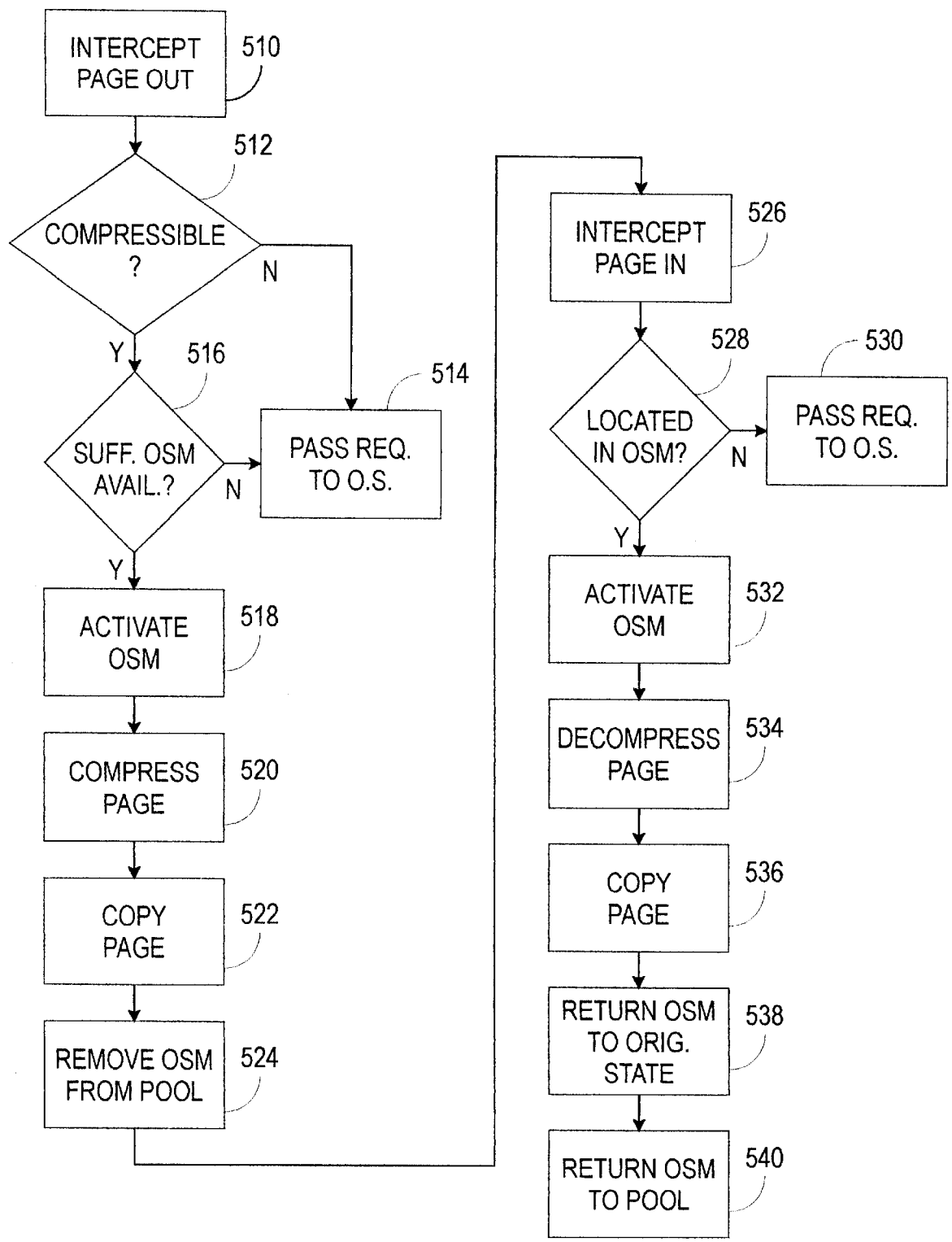
FIG. 5 is a flowchart illustrating paging to off-screen memory according to the invention.

The steps performed in paging to OSM are described with reference to the flowchart of FIG. 5. The invention is first installed into system memory 100 (FIG. 1) and enabled to intercept page-out requests and page-in requests from the operating system. This can be accomplished by means well known in the art.

The invention's paging system (FIG. 5) is invoked when a page-out request is intercepted (step 510). The memory contents sought to be paged out are then tested for compressibility (step 512). If the compressed page would not meet a predetermined compression threshold, the page-out request is passed along to the operating system (step 514) for normal processing. The paging system then checks if sufficient OSM is available (step 516). If not, the page-out request is again passed along to the operating system (step 514). If the memory contents are compressible and sufficient OSM is available, the OSM is activated (step 518). The page is compressed (step 520) and copied to OSM (step 522). The newly occupied OSM is then removed from the pool of available OSM (step 524).

When a page-in request is intercepted (step 526), the paging system determines whether the memory contents sought to be paged in are located in OSM (step 528). If not, the page-in request is returned to the operating system (step 530) for further processing in accordance with the operating system's usual page-in techniques. If the page is located in OSM, then OSM is activated (step 532), and the page is decompressed (step 534) and copied from the OSM (step 536). The OSM is then returned to its original de-activated state (step 538), and the freed OSM is returned to the pool of available OSM (step 540).

Figure 6:
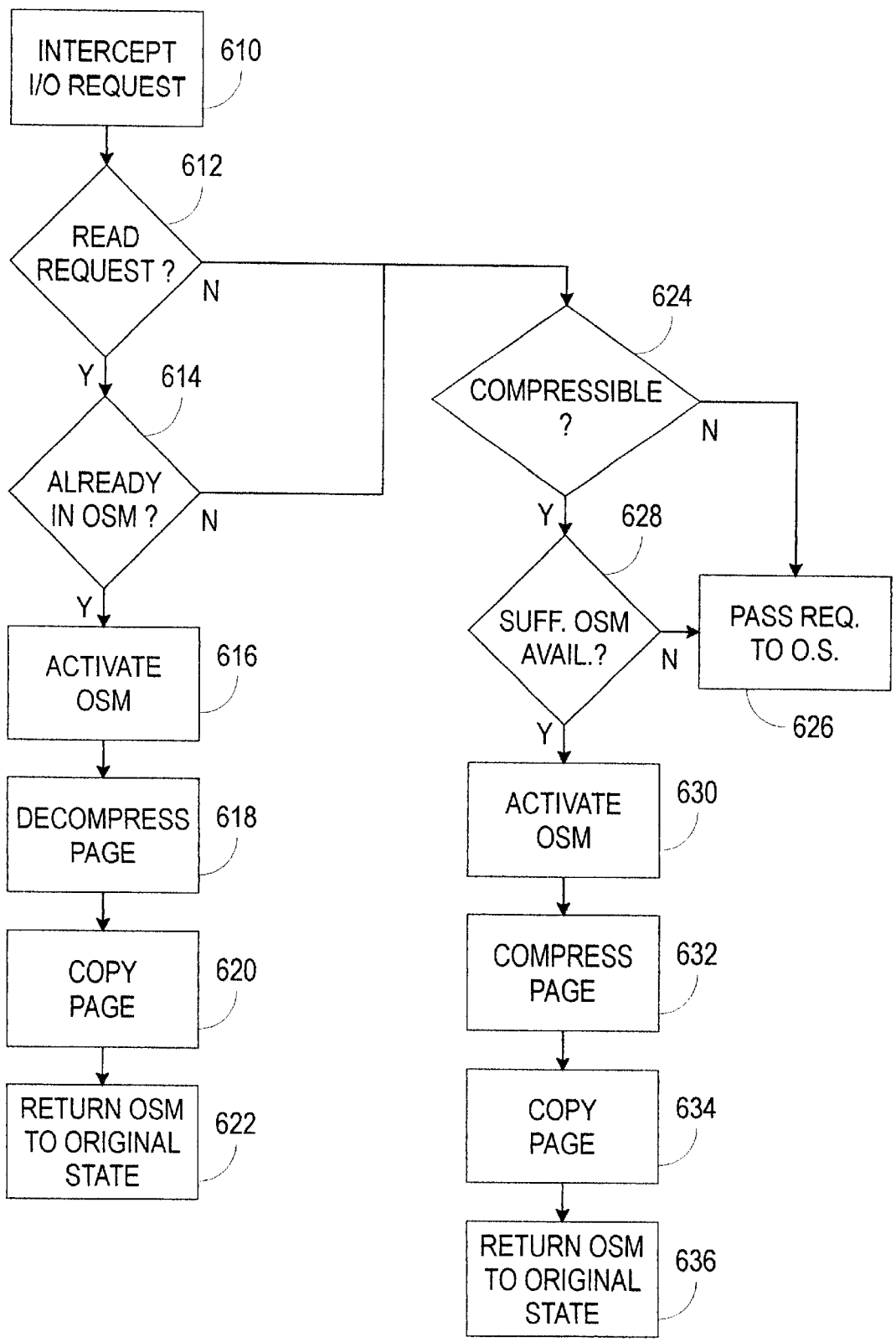
FIG. 6 is a flowchart illustrating caching to off-screen memory according to the invention.

Caching disk input/output requests to OSM according to the invention is described with reference to the flowchart of FIG. 6. The caching system is invoked when an I/O request is intercepted (step 610). The I/O request is examined to determine if it is a read request (step 612). If so, it is also examined to determine whether the data sought already resides in the OSM (step 614). If both conditions are satisfied, then OSM is activated (step 616), and the page sought from OSM is decompressed (step 618) and copied from OSM (step 620). The OSM is then returned to its original state (step 622).

If the I/O request is not a read request, or if it is not in OSM, then the memory contents sought to be written or read are first tested for compressibility (step 624). If the compressed page would not meet a predetermined compression threshold, as discussed above, they I/O request is passed along to the operating system (step 626) for usual processing. Then the availability of OSM is checked (step 628). If insufficient OSM is available to store another page, then the I/O request is passed along to the operating system (step 626). Otherwise, the OSM is activated (step 630). The page is compressed (step 632) and copied to OSM (step 634). The OSM is then returned to its original state (step 636).

Figure 7:
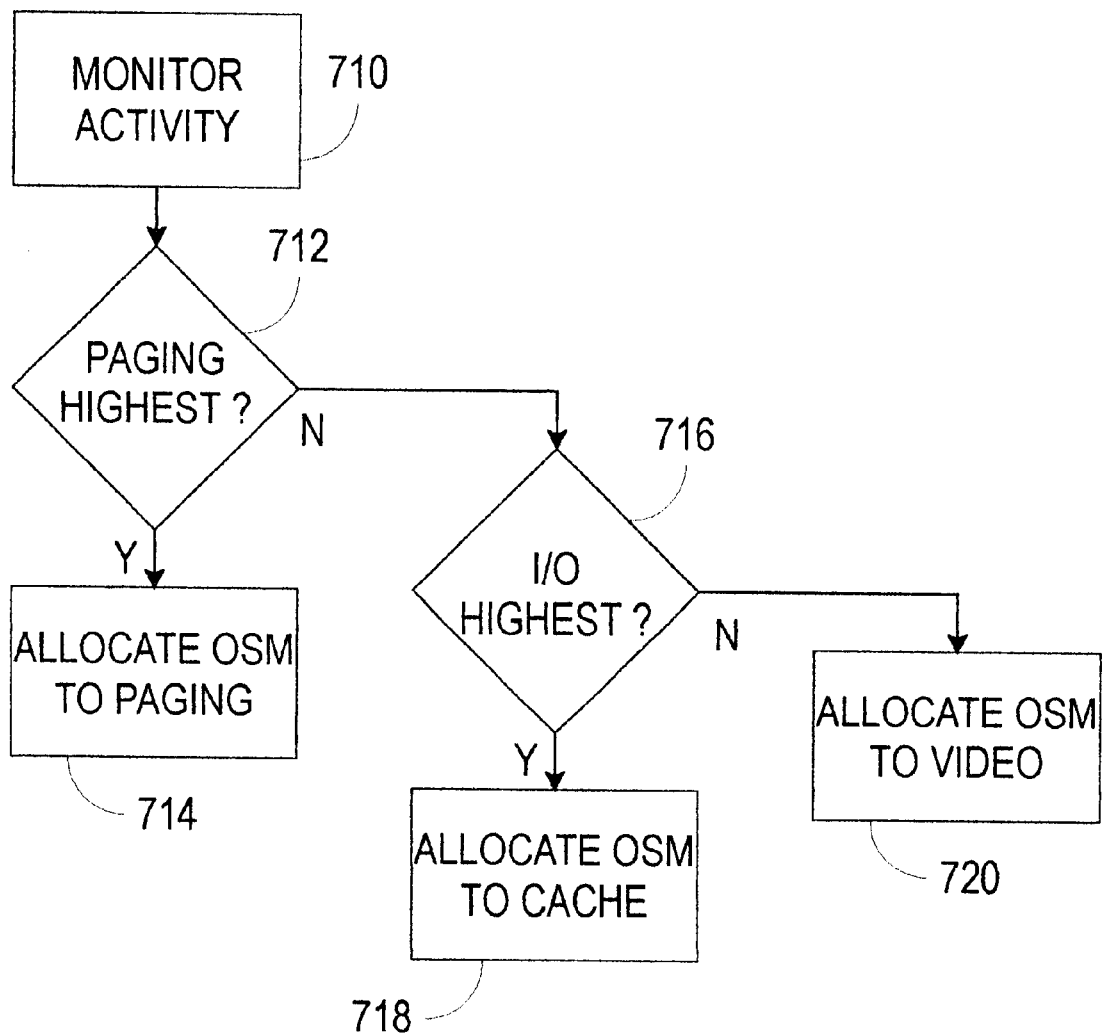
FIG. 7 is a flowchart illustrating activity monitoring and off-screen memory allocation.

As discussed above, the invention allocates OSM to paging, caching, or video use according to which use is most efficient. This function is described by the flowchart of FIG. 7. The invention monitors system activity (step 710), namely the likelihood of future paging activity (based on past paging activity), the level of disk activity, and the level of video activity. Each of these three factors is weighted based on its relative contribution to overall system performance. If the likelihood of future paging is high (i.e., it would impact system performance the most) (step 712), then OSM is allocated to handling paging requests (step 714). If not, then disk activity is also checked (step 716). If high disk activity contributes most to system performance, then OSM is allocated to the cache (step 718). Otherwise, video activity is assumed to be highest, and OSM is allocated to (or remains allocated to) the video driver (step 720).

Figure 8:
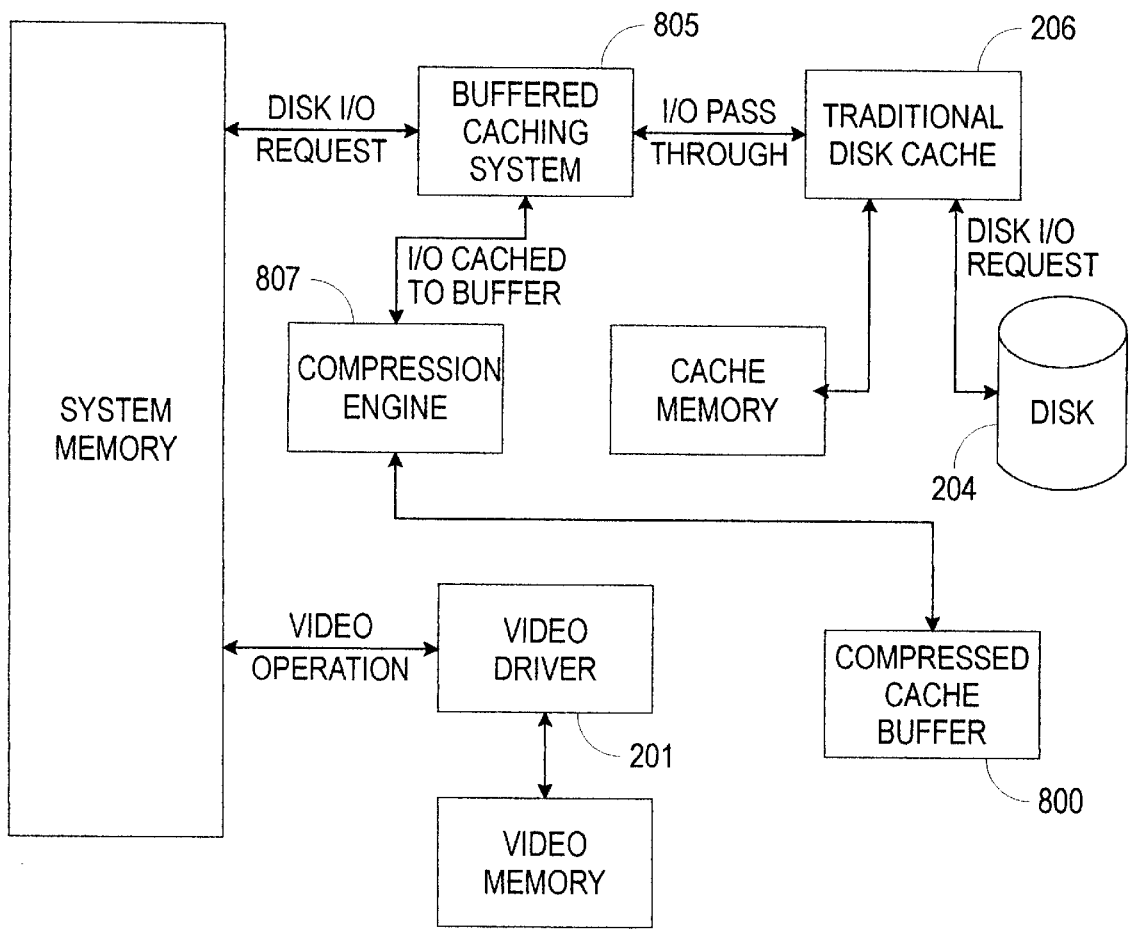
FIG. 8 is a representation of a personal computer system incorporating an alternative embodiment of the caching feature of the present invention.

An alternative disk caching implementation the invention, in which a cache buffer 800 (not necessarily within OSM) is used to store compressed disk cache contents, is shown in FIG. 8. Buffered caching engine software 805 of the invention directs I/O requests to the cache buffer 800 in a manner analogous to the use of a conventional disk cache 206 coupled with hard drive storage 204, as known in the art. As shown, the cache buffer 800 can be used in conjunction with a conventional disk cache system, intercepting the disk I/O requests before they are processed by the disk cache 206. The buffered caching system 805 is programmed to selectively disable the traditional cache 206 to prevent duplication of the cache function.

In order to increase the effectiveness of the caching implementation, a data compression engine 807 is used to compress the data being transferred to the cache buffer 800. In a preferred embodiment of the invention, each data item being transferred to the cache buffer 800 is incrementally compressed. If the compression ratio achievable for compressing the first small portion of the data item is not of a chosen minimal ratio, preferably at least in the range of 1.5 to 1, the data item is not stored in the cache buffer 800, and the buffered caching system 805 channels the data through the alternate, conventional pathway, which may include, for the cache system, utilization of the traditional disk cache 206. Alternatively, the data may be stored in the cache buffer 800, but without the compression step. The engine may appropriately keep track of such activities to effect efficient retrieval. It should be noted that the cache buffer 800 in the described embodiment of the invention may be taken from any available source of random-access memory on the computer system. For example, it may be a portion of unused system memory 100, part of the off-screen video memory 200 (FIG. 2), part of the traditional disk cache 206 (FIG. 2), or a dedicated memory subsystem.

Figure 9:
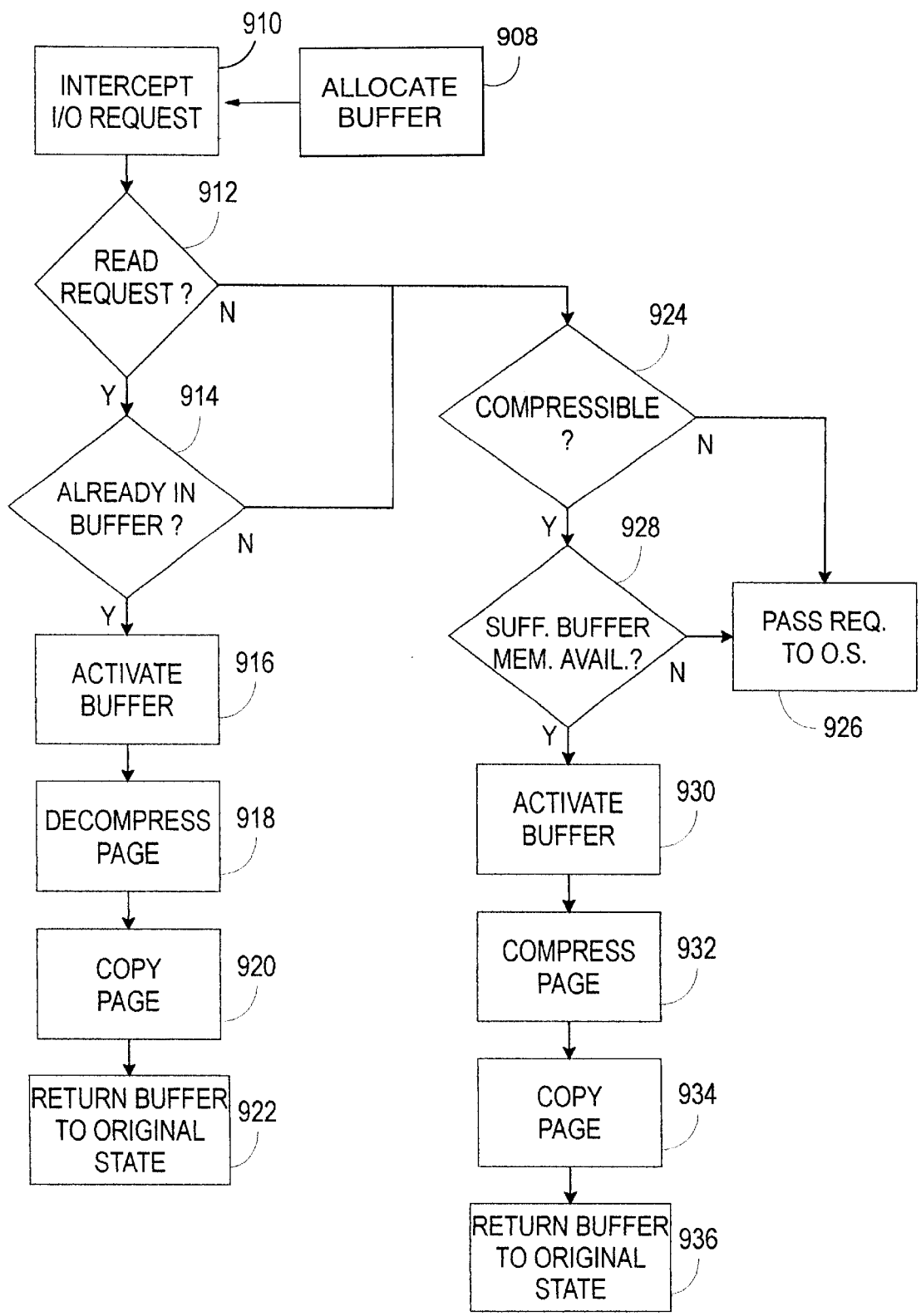
FIG. 9 is a flowchart illustrating compressed caching to a cache buffer according to the invention.

Caching compressed disk input/output requests to the cache buffer 800 according to the invention is described with reference to the flowchart of FIG. 9. If not already so, the cache buffer 800 is allocated (step 908). The caching system is invoked when an I/O request is intercepted (step 910). The I/O request is examined to determine if it is a read request (step 912). If so, it is also examined to determine whether the data sought already resides in the OSM (step 914). If both conditions are satisfied, then OSM is activated (step 916), and the page sought from OSM is decompressed (step 918) and copied from OSM (step 920). The OSM is then returned to its original state (step 922).

If the I/O request is not a read request, or if it is not in OSM, then the memory contents sought to be written or read are first tested for compressibility (step 924). If the compressed page would not meet a predetermined compression threshold, as discussed above, the I/O request is passed along to the operating system (step 926) for usual processing. Then the availability of OSM is checked (step 928). If insufficient OSM is available to store another page, then the I/O request is passed along to the operating system (step 926). Otherwise, the OSM is activated (step 930). The page is compressed (step 932) and copied to OSM (step 934). The OSM is then returned to its original state (step 936).

Although exemplary embodiments of the invention have been described and disclosed in detail, the invention itself is not so limited, and should be construed with reference to the claims set forth below.

What is claimed is:

1. A hierarchical caching method for standard disk I/O caching in a personal computer system having RAM and a storage disk, comprising the steps of:
   allocating a buffer from the RAM;
   intercepting disk page I/O requests;
   upon the interception of a disk page I/O request, if the intercepted I/O request is a read request, determining if the page to be read is already in the buffer and if so, decompressing the contents of the page into a RAM memory location specified for the page contents in the read request;
   if the intercepted I/O request is a read request, and the page to be read is not already in the buffer, or if the intercepted I/O request is a write request:
      determining if sufficient space in the buffer is available to hold the page data to be read or written;
      if sufficient space is available, copying the contents of the read or written page to the buffer;
   determining the compressibility of the contents of the page by pre-compressing a small portion thereof; and
   if the compression ratio for the small portion is at least two to one, compressing the read or written page in cache, otherwise allowing the operating system to cache the page contents in its normal manner.

2. A caching method for standard disk I/O caching in a personal computer system having RAM, a storage disk, and a RAM-based disk cache, comprising the steps of:
   intercepting disk page I/O requests;
   upon the interception of a disk page I/O request, if the intercepted I/O request is a read request, determining if the page to be read is not already in the cache, or if the intercepted I/O request is a write request:
      determining if sufficient space in the cache is available to hold the page data to be read or written;
      if sufficient space is available, writing the contents of the read or written page to the cache; and
      determining the compressibility of the contents of the page by pre-compressing a small portion thereof; and
      if the compression ratio for the small portion is at least two to one, compressing the read or written page in the cache, otherwise bypassing the compression step;
   or if the intercepted I/O request is a read request, and the page to be read is already in the cache:
      determining whether the page to be read is compressed;
      if the page is compressed, decompressing the contents of the page into a RAM location specified for the page contents in the read request; and
      if the page is not compressed, copying the contents of the page into a RAM location specified for the page contents in the read request.

3. A method of caching virtual memory demand paging requests in a personal computer system having an operating system and a video system including off-screen memory (OSM), comprising the steps of:
   intercepting page-out requests made by the operating system;
   for each intercepted page-out request, subsequently determining if sufficient OSM is available to hold the contents of the page-out request, and if so, copying the contents to an OSM region;
   intercepting page-in requests made by the operating system; and
   for each intercepted page-in request, subsequently determining if the page being requested is located in OSM, and if so, retrieving the page contents into a RAM memory location specified for the page by the operating system;
   determining the compressibility of the contents of the page by pre-compressing a small portion thereof; and
   if the compression ratio for the small portion is at least two to one, compressing the contents of the page-out request, otherwise allowing the operating system to cache the page contents in its normal manner.

* * * * *

UNITED STATES PATENT AND TRADEMARK OFFICE
CERTIFICATE OF CORRECTION

PATENT NO.   : 6,321,293 B1
DATED        : November 20, 2001
INVENTOR(S)  : Daniel Fabrizio et al.

Page 1 of 1

It is certified that error appears in the above-identified patent and that said Letters Patent is hereby corrected as shown below:

<u>Title page,</u>
Item [73] Assignee, change "Networks Associates, Inc., Long Island, NY (US)" to -- Network Associates, Inc., Long City, NY (US) --.

Signed and Sealed this

Twenty-first Day of May, 2002

Attest:

JAMES E. ROGAN
*Director of the United States Patent and Trademark Office*

*Attesting Officer*